Patented June 17, 1941

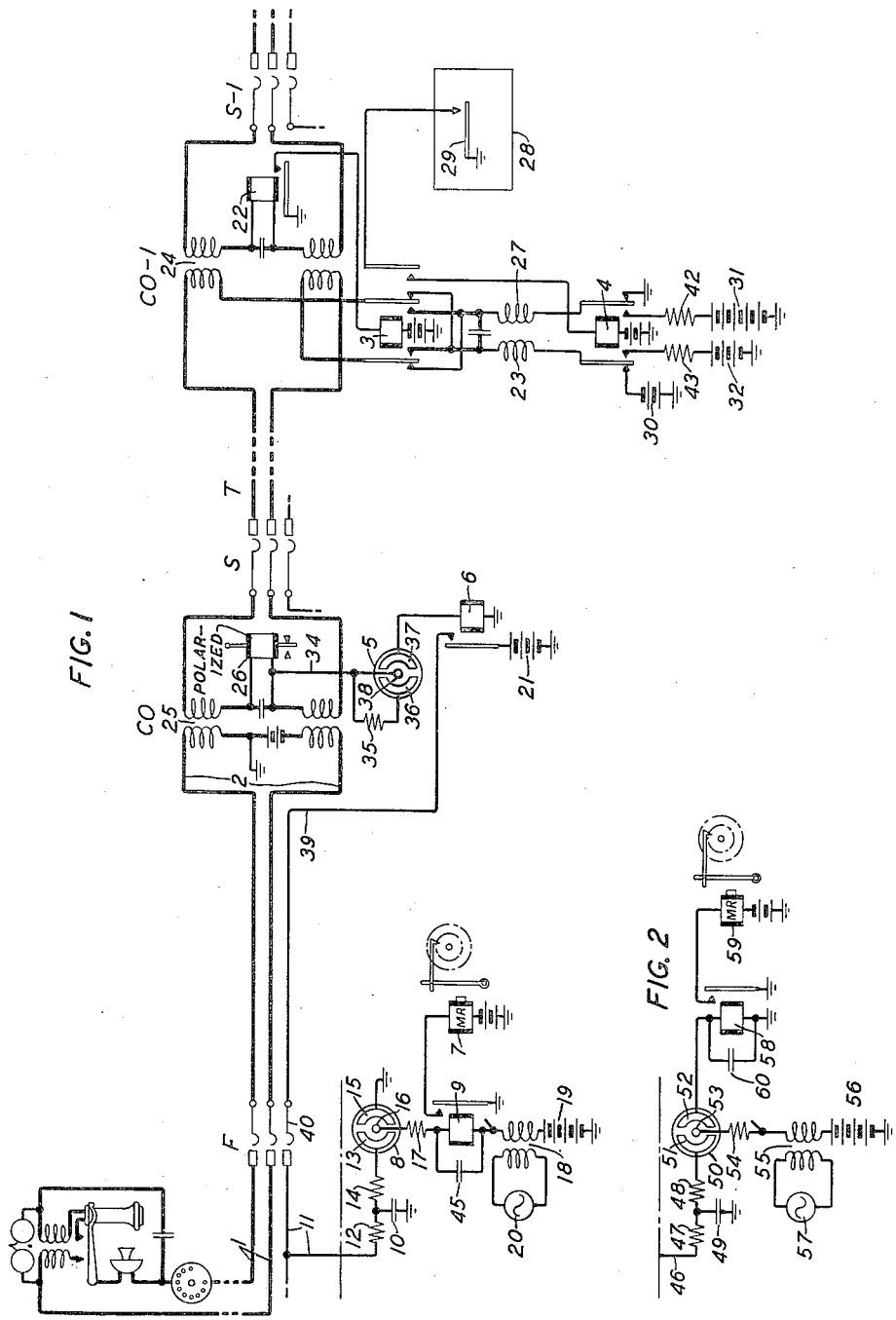

2,246,046

UNITED STATES PATENT OFFICE 2,246,046

TIMING MECHANISM

William H. T. Holden, Long Island City, N. Y., assignor to Bell Telephone Laboratories, Incorporated, New York, N. Y., a corporation of New York Application March 23, 1939, Serial No. 263,583

14 Claims. (Cl. 250—27)

This invention relates to electrical timing mechanisms and particularly to circuit arrangements for measuring desired intervals of time.

The objects of the invention are to obtain greater reliability in the operation of circuits for the accurate measurement of time intervals; to safeguard these timing circuits against false operations; to simplify their restoration to normal condition after each use; and to secure other improvements therein.

Various time measuring circuits have been proposed heretofore which make use of the principle that the time required to charge a condenser to a value necessary to produce ionization in the control gap of a gas-filled discharge tube can be fixed accurately by selecting the resistance of the charging circuit. The ionization of the control gap produces current flow in the main gap and anode circuit of the tube, and a relay therein operates to mark the completion of the measured interval.

It is also the general practice in circuits involving these gas-filled discharge tubes to provide circuit-controlling contacts in the anode circuit for the purpose of quenching the main discharge gap when it is desired to restore the tube circuit to its normal condition. This is particularly necessary where a source of direct current is employed for supplying the anode circuit. To obviate the necessity of using the switch-controlling contacts, suggestions have been made in the past to superimpose a source of alternating potential upon the direct current source in the anode circuit of the tube. The direct and alternating potential values are chosen such that the effective potential across the anode gap is insufficient to maintain discharge during each half cycle that the alternating voltage is in opposition to the direct voltage. If, however, this method of quenching the anode discharge is applied to a tube circuit designed for measuring time intervals, as above explained, there is a tendency for the circuit to oscillate at a rate dependent upon the charging rate of the time measuring condenser.

According to the present invention it is possible to obtain the advantages of using alternating potential for quenching the tube in a time measuring circuit and to obviate the disadvantages above noted by means of a timing circuit in which oscillation is prevented by limiting the rate at which the time measuring condenser discharges through the control gap of the tube. This may be achieved by including a resistance of sufficient value in the discharge circuit of the timing condenser. If this current limiting resistance is made at least equal to or greater than the resistance in the charging circuit, it is possible to obtain substantial time intervals without the undesired oscillation. By making the resistance in the discharge circuit substantially equal to the resistance in the charging circuit the current drawn from the condenser to ionize the tube does not exceed that supplied to replenish the condenser over the charging circuit.

As the length of the measured interval is increased, this method of using substantially equal resistances in the charging and discharge circuits to prevent oscillation requires the use of larger and larger resistance values in the discharge circuit to correspond with the larger resistances included in the charging circuit to obtain the longer intervals. But the use of alternating potential for quenching the anode circuit increases the voltage which the tube must withstand without direct ionization, and this requires higher transfer currents for ionizing the tube. In obtaining these longer intervals, therefore, it is not always feasible to increase beyond certain limits the value of the resistance in the discharge circuit, since this limits the amount of transfer current available to ionize the tube.

Accordingly, it is another feature of the invention to obtain these longer delay intervals by selecting the resistance in the discharge circuit at a value substantially less than that of the resistance in the charging circuit, so that sufficient current may be drawn from the condenser to ionize the tube, and by providing further means for replenishing the charge on the condenser to prevent oscillation. This feature is attained by connecting the work relay in the anode circuit to the cathode of the tube so that the induction of the relay, produced by the anode current at each half-cycle of the alternating voltage, raises the potential of the cathode with respect to the control electrode sufficiently to cause a recharging current to flow back into the time measuring condenser. The effect of this recharging current is to replace the current that is drawn from the condenser to ionize the control gap. If, however, the recharging current were permitted to exceed the discharge current, the time measuring condenser would maintain its full charge indefinitely, even after the original charging circuit is opened, and the alternating voltage in the anode circuit would no longer be effective to quench the tube. To avoid this a second condenser is connected in parallel with the winding of the work relay for the purpose of fixing the potential of the cathode produced by the inductance of the relay at a value such that the recharging current flowing back into the time measuring condenser is somewhat less than the discharge current therefrom. Moreover the value of the recharging current is such that the sum of the recharging current and the original charging current is greater than the discharge current, whereby the time measuring condenser is maintained charged to the ionizing voltage of the control gap of the tube as long as the original charging circuit is closed. As soon as the original charging circuit is opened, however, the charge on the time measuring condenser begins to decline by reason of the fact that the discharge current exceeds the recharging current. When, therefore, the potential of the time measuring condenser falls below the ionizing voltage of the tube, the anode discharge is quenched, and the circuit is fully restored to its normal condition.

The foregoing and other features and advantages of the invention will be discussed more fully in the following detailed specification.

In the drawing accompanying the specification:

Fig. 1 illustrates the invention applied to a telephone system. In this figure the timing circuit is arranged to measure time intervals of limited duration, and the tube circuit is prevented from oscillating by making the resistance in the discharge circuit substantially equal to that in the condenser charging circuit; and Fig. 2 shows a modification of the timing circuit for obtaining intervals of unlimited duration, the circuit being prevented from oscillating by recharging the condenser from the tube.

Although the invention in its broader aspects relates in general to time measuring circuits, it is capable of being used for numerous specific purposes, particularly in telephone and other communication systems. In the embodiments chosen for illustration herein it is applied specifically to the control of operating circuits for message registers in dial telephone systems.

Referring to the drawing and particularly to Fig. 1, in which all circuits and apparatus not essential to a clear understanding of the invention have been omitted, there is disclosed a subscriber's line 1 appearing in a line-finder switch F at the central office CO. The finder switch F is interconnected by means of a link 2 with a first or district selector switch S in the office CO which has access to trunks outgoing from office CO, such as the trunk T, extending to the distant central office CO—1. A selector switch S—1 is also shown in the central office CO—1, which, together with the succeeding selectors, serves to extend the connection through to a called subscriber's line.

The equipment shown in association with the link circuit 2 in the central office CO and the equipment associated with the incoming end of the trunk T at the distant office CO—1 is for the purpose of charging the calling subscriber at periodic intervals, during the conversation, according to the zone into which the connection has been extended. The information necessary to determine the rate of the charge is obtained in the well-known manner by equipment, not shown, at the office CO—1 and is utilized to control the circuits illustrated, including relays 3 and 4, to send metering impulses, at the required intervals of time, back over the trunk T to the originating office CO. The receiving equipment at the office CO, including the gas-filled discharge tube 5 and work relay 6, responds to these metering impulses and in turn applies operating potential to the individual control circuits of the calling subscriber's line 1 for the purpose of effecting the operation of his message register.

In addition to the usual message register 7 the subscriber's line 1 is equipped with a gas-filled discharge tube 8, a work relay 9 and a time measuring condenser 10. The condenser 10 is connected to the sleeve conductor 11 of the line through a resistance element 12 and also to the control electrode 13 of the tube 8 through a resistance element 14. The work relay 9 is connected in the anode circuit.

The anode 16 is connected through an individual resistance element 17, through relay 9 and the secondary winding of a transformer 18, to the positive pole of anode battery 19. The primary winding of the transformer 18 is connected to the alternating potential source 20. The voltage of the anode battery 19 is sufficient to establish a discharge across the main gap of the tube in response to ionization of the control gap and to maintain the anode discharge after discharge has ceased across the control gap. Since, therefore, the anode discharge continues independently of the control gap, it becomes necessary to provide some means for quenching the anode gap to permit the release of relay 9 and the associated message register 7. This is accomplished by means of the alternating potential source 20. The voltage impressed upon the anode circuit by the source 20 is high enough to quench the anode discharge during each of the alternate oscillations of the alternating potential that opposes the direct potential source 19.

Since it is possible to assign the battery 19, the transformer 18 and the source 20 in common to a group of subscribers' lines, a considerable saving is realized by using the alternating current method of quenching the anode discharge in comparison with the use of means for opening the anode circuits of the several lines individually.

The purpose of the condenser 10 and the resistance 12 is to enable the mechanism, including the tube 8, to measure a predetermined interval of time between the closure of the charging circuit and the firing of the tube and the consequent operation of the work relay 9. The desired interval is predetermined by selecting the value of the resistance 12 so that the charge accumulated on the condenser 10 from the charging battery 21 is, at the end of the interval, just sufficient to ionize the control gap 13—15 of the tube. The measured interval may be varied over a wide range by varying the value of the resistance 12 to suit the particular purpose for which the timing mechanism is employed. In the present instance, where the timing mechanism is used in connection with the operation of a subscriber's message register, it is desirable to delay the operation of the message register for an interval of time following the operation of the relay 6 in response to an impulse of current transmitted over the trunk T. The reason for this delay is to discriminate between a bona fide metering impulse transmitted from the central office CO—1 and a transient impulse of current flowing over the line T and falsely operating the relay 6. If the relay responds to a transient current, it will release and open the charging circuit 11 before condenser 10 has reached the voltage sufficient to fire the tube. However, when the relay 6 responds to an impulse of metering current sent over the trunk T, the closure of the charging circuit is maintained long enough for the condenser to reach the predetermined value necessary to fire the tube.

To insure the firing of the tube and the operation of the register in response to the metering impulse it is convenient in the practical operation of the system to design the circuits so that the metering impulse from the distant office CO—I is applied to the trunk not only for the exact interval measured by the timing mechanism but for a substantial period longer than this interval. In this way the operation of the register for each metering impulse is assured without the necessity of providing accurate timing devices at the office CO—I. Because, however, the charging circuit for condenser 10 is maintained for a substantial interval after the tube fires, it is necessary to prevent the permanent quenching of the tube during this interval. Otherwise the tube might fire a second time to cause a false operation of the message register. For example, if the charging circuit of condenser 10 is closed, under the control of the metering impulse transmitted over the trunk T, for a period which is two or more times as great as the interval measured by the condenser 10, the tube would operate repeatedly a corresponding number of times and cause the repeated operation of the register unless, as mentioned, some means is employed to prevent the tube from quenching after the original discharge. As was explained in the early part of the description, the discharge of the tube is maintained under these conditions, notwithstanding the periodic quenching of the anode gap by the alternating potential source 20, either by the arrangement of Fig. 1, in which the resistance 14 is relatively high to prevent draining condenser 10, or by the arrangement of Fig. 2, in which resistance 48 is relatively lower and the condenser 49 is replenished by the inductive effect of relay 58. The manner in which this is accomplished will be described presently.

It will be understood, as previously mentioned, that the timing circuits disclosed herein are not limited in their use to any particular kind of system. They may be used wherever it is desired to measure accurate intervals of time, the circuit of Fig. 1 being suitable for intervals of substantial duration and that of Fig. 2 for intervals of indefinite length. In order to better illustrate their utility these timing circuits have been shown in connection with an automatic telephone system, which may be of any well-known type. The mechanism associated with these automatic systems for determining the zone of the call and the rate at which the calling subscriber's register should be operated may likewise be any of the types now well known in the art. More specifically, zone and time charging control mechanisms are shown in detail in the following patents: Stokely, 2,029,683 of February 4, 1936; Stokely, 2,034,846 of March 24, 1936; Collis, 1,837,206 of December 22, 1931; Scudder, 2,089,438 of August 10, 1937; and Hatton et al., 2,040,308 of May 12, 1936.

The operation of the system will now be explained. Assume for this purpose that the subscriber of line I in Fig. 1 wishes to converse with another subscriber whose line is reached through the office CO—I. Assume also that the called line is in a distant zone and that the calling subscriber's register should be operated at periodic intervals throughout the duration of conversation. When the calling subscriber initiates a call, the line finder F seizes the line and conditions the equipment for the receipt of dial impulses. In the well-known manner the calling subscriber manipulates his dial to transmit the designation impulses to the central office CO, and the selector switch S is operated to seize the trunk line T extending to the distant office CO—I. Thereafter the selector switch S—I and succeeding switches are operated to further extend the connection to the called subscriber's line.

Prior to the response by the called subscriber current is supplied to the trunk T over a circuit from battery through the left back contact of relay 4, coil 23, inner right back contact of relay 3, upper left winding of repeating coil 24, thence over the trunk T through the switch S, upper right winding of repeating coil 25, winding of supervisory relay 26, lower right winding of coil 25 and returning over the trunk T, through the lower left winding of coil 24, left back contact of relay 3, coil 27 to ground at the right back contact of relay 4. Relay 26 does not operate in response to current flowing in this direction. When the called subscriber answers, supervisory relay 22 operates and closes an obvious circuit for relay 3. Relay 3 reverses the direction of current flowing over the trunk T to operate relay 26 and prepare the circuits in the central office CO for conversation and for registration. Relay 3 also closes a circuit from the charging mechanism 28 to the winding of relay 4. The mechanism 28, by means of a circuit-controlling contact 29, serves to operate and release relay 4 during the conversation period at a rate which depends upon the zone into which the calling subscriber has extended the connection. The manner in which this zone information is obtained and utilized by the controlling mechanism 28 may be similar to that disclosed and described in detail in the patents above mentioned.

On the first operation of relay 4 the battery 30, which furnishes talking current to the trunk T for conversation, is disconnected at the back contacts of said relay, and the high potential batteries 31 and 32 are connected to the trunk over the front contacts of the relay. The circuit for battery 31 includes the control gap of the tube 5 and may be traced from the positive pole of said battery, resistance 42, right contact of relay 4 thence through the contacts of relay 3 over the upper conductor of trunk T through the upper right winding of coil 25, winding of supervisory relay 26, conductor 34, resistance 35, control gap of the tube 5, formed by the control electrode 36 and cathode 37, and the winding of relay 6 to ground. The circuit for the battery 32 also includes the control gap of the tube 5 and differs only from the circuit just traced in that it extends through resistance 43 over the lower conductor of the trunk T and through the lower right winding of coil 25 directly to conductor 34. The battery 31 is of substantially higher voltage than battery 32. This difference in voltage causes talking current to flow in the loop circuit of the trunk T, including the winding of the supervisory relay 26, during the time the relay 4 is operated to send the metering signal back to the central office CO. The presence of talking current in the trunk T during this interval maintains the proper transmission conditions and insures the holding of the supervisory relay 26. The voltage applied across the control gap of the tube 5 by the batteries 31 and 32 ionizes the tube, whereupon current flows through the conductor 34 by way of the anode 36 and cathode 37 and the winding of relay 6 to ground. Relay 6 operates and closes a circuit from the positive pole of battery 21 over conductor 39, brush 40, sleeve conductor 11, resistance 12 to the time measuring condenser 10.

The condenser 10 assumes a charge, which at the end of the predetermined interval is sufficient to ionize the control gap of tube 8. The discharge circuit, whereby the condenser 10 applies its voltage across the control gap of the tube, may be traced from one pole of the condenser through the resistance 14, control gap 13—14, to ground and thence to the opposite pole of the condenser. The value of the discharge current is limited by resistance 14. By making this resistance as large or somewhat larger than resistance 12 it is possible to limit the discharge taken from the condenser, for ionizing the control gap of the tube at each successive cycle of the source 20, to an amount which is less than the replenishing charge received by the condenser over charging circuit 11 and resistance 12. The resistance 14 also serves to protect the electrodes of the tube from injury.

As soon, following the ionization of the control gap, as the potential source 20 is in the direction to aid the battery 19, current flows in the anode circuit in sufficient intensity to operate relay 9. The anode circuit may be traced from the positive pole of battery 19, winding of transformer 18, relay 9, resistance 17, anode gap 16—15 to ground. Relay 9 operates the message register 7 to score a count. On the next alternation of source 20 the potential induced in the anode circuit opposes battery 19 and reduces the voltage across the main gap to the point where the discharge is quenched, and the anode current ceases to flow. During this opposing alternation, however, the condenser 10 has recovered its charge and ionizes the control gap so that discharge again occurs across the main gap as soon as the source 20 again changes direction and aids the battery 19. Thus, for each cycle of the source 20, the main gap of the tube is quenched and is re-ionized by the control gap. The relay 9, once operated, is held energized during the successive quenchings of the tube by means of a condenser 45, which charges when current is flowing in the anode circuit and discharges through the relay when the tube quenches. This condition of the timing circuit continues as long as the charging circuit of condenser 10 remains closed and is independent of the length of the interval measured by the condenser when the charging circuit was first closed.

When, later, the relay 4 is released at the office CO—1, the tube 5 quenches, and relay 6 releases and opens the charging circuit of condenser 10. The charge on condenser 10 now falls below the ionizing voltage of the tube 15, and the main gap of the tube, having been quenched by the next opposing alternation of source 20, fails to re-ionize. Thereupon the relay 9 releases and releases the register 7.

For each successive operation and release of the relay 4 a similar cycle of operation is performed by the time measuring circuit, and a single operation of the message register is effected.

When the subscribers finally terminate their conversation and replace their receivers on the switchhooks, the connection is released in the well-known manner, and the time measuring circuits are restored to their normal condition.

A description will now be given of the timing circuit shown in Fig. 2, which is designed to measure relatively long intervals of time. For the purpose of understanding its operation, it may be assumed that the circuit of Fig. 2 is applied to the telephone system of Fig. 1 in place of the timing circuit above described.

When the relay 6 is operated, as previously described, the charging battery 21 is applied to condenser 49 over a circuit extending from battery 21, contact of relay 6, conductor 39, brush 40, conductor 11, conductor 46, charging resistance 47 to condenser 49. Condenser 49 assumes a charge, which at the end of the measured interval is sufficient to ionize the control gap 51—52 of the tube 50. The discharge circuit may be traced from one pole of condenser 49, through resistance 48, control gap 51—52, winding of relay 58, to ground and the other pole of condenser 49.

Since in this case a longer interval of time is required, the value of resistance 47 is substantially greater than resistance 48. Hence, the amount of charge taken from condenser 49 to maintain the tube ionized is greater than the replenishing charge received over the charging circuit 46. Nevertheless the charge on condenser 49 is maintained by means of the induction of relay 58, which, it will be noted, is connected to the cathode 52 and hence in the discharge circuit of condenser 49.

As soon, following the ionization of the control gap, as the potential source 57 is in the direction to aid the battery 56, current flows in the anode circuit in sufficient intensity to operate the relay 58. The path for this operating current extends from the positive pole of battery 56, winding of transformer 55, resistance 54, anode 53, cathode 52, through the winding of relay 58 to ground. At the same time the condenser 60 is charged in parallel with the relay 58. Relay 58 operates the message register 59 to score a count. The winding of relay 58 induces a voltage which is applied across the control gap of the tube, the resistance 48, and the condenser 49. This voltage is also applied across the condenser 60. The voltage thus produced across the control gap of the tube raises the potential of the cathode 52 above that of the control electrode 51 which terminates the discharge of condenser 49 and causes a current to flow in the discharge circuit through the resistance 48 and into condenser 49, recharging the condenser. The value of the recharging current depends upon the condenser 60 and on the resistance 48 and is, as hereinbefore explained, so chosen that it is sufficient when added to the current received over the closed charging circuit 46 to hold the condenser 49 charged to the ionizing voltage of the tube. On the next alternation of the source 57, the alternating potential induced in the anode circuit opposes battery 56 and reduces the potential across the main discharge gap to the point where the discharge across this gap is quenched. As the current declines in the anode circuit, the charge on condenser 60 causes a current flow through the winding of relay 58 to assist the relay in holding its armature closed until full energizing current again flows from the battery 56 through the main discharge gap and the winding of the relay 58. On the next aiding alternation of the potential source 57 current flows again in the anode circuit, since ionization of the control gap is maintained by the recharged condenser 49. Thus, for each cycle of the alternating source 57 the main discharge gap of the tube 50 passes operating current for the relay 58, the condenser 49 is recharged by the induced potential across the winding of relay 58, and the condenser 60 regulates the amount of recharging current flowing back into the condenser 49 and insures the maintained operation of relay 58 through the cycle. This condition of the time measuring circuit prevails as long as the charging circuit of condenser 49 is closed and is independent of the relation between the measured interval of the time measuring circuit and the duration of the closure of the charging circuit.

When, thereafter, the relay 4 is released by the mechanism 28, the tube 5 quenches and relay 6 releases. This opens the charging circuit of condenser 49, and charging current no longer flows from the battery 21 into said condenser by way of resistance 47. Thereafter, the main discharge gap of the tube is quenched on successive alternations of the source 57, and at each alternation the potential on cathode 52 produced by relay 58 and condenser 60 causes a recharging current to flow back into the condenser 49. Since, however, the discharge taken from the condenser 49 to maintain ionization of the control gap, during those portions of the alternating potential cycle when no recharging current is flowing, exceeds the amount of recharge derived from the inductive reactance of relay 58, the voltage of the condenser 49 soon falls below the ionizing voltage of the control gap. As soon as this occurs the main discharge gap is permanently quenched by the alternating potential source 57, and relay 58 releases to open in turn the message register circuit.

It is possible, therefore, with the circuits disclosed herein to measure accurately intervals of any desired length of time, to effect the operation of work devices, such as message registers, and to safeguard these devices from false operation. It is also possible to release timing circuits and to quench the discharge of the associated gas-filled tube by means of an alternating potential source without causing undesirable oscillations of the tube circuit.

While the timing circuit illustrated herein employs a gas-filled tube of the cold cathode type, it is not intended that the invention should be so limited. If desirable, tubes of the hot cathode type may be used effectively for the purposes disclosed herein.

What is claimed is:

1. The combination in a timing mechanism of a condenser, a source of charging current for charging said condenser to a predetermined value in a desired interval of time, a gas-filled tube having a control gap and an anode gap, a discharge circuit including said condenser and said control gap for maintaining said control gap ionized as long as said condenser remains charged to a predetermined value, an anode circuit including the anode gap of said tube, means for causing a current discharge to occur across the anode gap in response to ionization of said control gap, a resistance in the discharge circuit sufficiently high to prevent the discharge taken from said condenser from lowering the charge thereon below said predetermined value, and alternating potential means associated with said anode circuit for repeatedly quenching the discharge in said anode gap.

2. The combination in a timing mechanism of a condenser, a charging circuit and a source of charging current therein for charging said condenser and for replenishing the charge thereon while said circuit is closed, a gas-filled tube having a control gap and an anode gap, a discharge circuit including said condenser and said control gap for maintaining said control gap ionized as long as the charge on said condenser equals a predetermined value, an anode circuit including the anode gap of said tube, means for causing a current discharge to occur across the anode gap in response to each ionization of said control gap, a resistance in said charging circuit, a resistance in said discharge circuit substantially equal to said first-mentioned resistance to limit the discharge taken from said condenser to an amount not greater than the replenishing charge acquired by said condenser over said charging circuit, and means for repeatedly quenching the discharge across said anode gap.

3. The combination in a timing mechanism of a condenser, a charging circuit and a source of charging current therein for charging said condenser and for replenishing the charge thereon while said circuit is closed, a gas-filled tube having a control gap and an anode gap, a discharge circuit including said condenser and said control gap for maintaining said control gap ionized as long as the charge on said condenser equals a predetermined value, an anode circuit including the anode gap of said tube, means for causing a current discharge to occur across the anode gap in response to each ionization of said control gap, a resistance in said charging circuit, a resistance in said discharge circuit so proportioned with respect to said first-mentioned resistance as to prevent the discharge taken from said condenser from lowering the charge thereon below said predetermined value, and a source of alternating potential in said anode circuit for quenching the discharge in said anode gap at each alternate oscillation of said alternating potential source.

4. The combination in a timing mechanism of a condenser, a source of charging current for charging said condenser to a predetermined value in a desired interval of time, a gas-filled tube having a control gap and an anode gap, a discharge circuit including said condenser and said control gap for maintaining said control gap ionized as long as said condenser remains charged to a predetermined value, an anode circuit including the anode gap of said tube, means for causing a current discharge to occur across the anode gap in response to ionization of said control gap, a resistance in the discharge circuit for limiting the amount of discharge taken from said condenser, and a source of alternating potential for quenching the discharge in said anode gap.

5. The combination in a timing mechanism of a condenser, a source of charging current for charging said condenser to a predetermined value in a desired interval of time, a gas-filled tube having a control gap and an anode gap, a discharge circuit including said condenser and said control gap for maintaining said control gap ionized as long as said condenser remains charged to said predetermined value, an anode circuit including the anode gap of said tube, means for causing a current discharge to occur across the anode gap in response to ionization of said control gap, means for repeatedly quenching the discharge across said anode gap, and means for causing a recharging current to flow in said discharge circuit to maintain the charge on said condenser.

6. The combination in a timing mechanism of a condenser, a source of charging current for charging said condenser to a predetermined value in a desired interval of time, a gas-filled tube having a control gap and an anode gap, a discharge circuit including said condenser and said control gap for maintaining said control gap ionized as long as said condenser remains charged to said predetermined value, an anode circuit including the anode gap of said tube, means for causing a current discharge to occur across the anode gap in response to ionization of said control gap, means for repeatedly quenching the discharge across said anode gap, and means for causing a recharging current to flow in said discharge circuit to recharge said condenser by an amount which is less than the discharge taken from said condenser to maintain said control gap ionized.

7. The combination in a timing mechanism of a condenser, a source of charging current for charging said condenser to a predetermined value in a desired interval of time, a gas-filled tube having a control gap and an anode gap, a discharge circuit including said condenser and said control gap for maintaining said control gap ionized as long as said condenser remains charged to said predetermined value, an anode circuit including the anode gap of said tube, means for causing a current discharge to occur across the anode gap in response to ionization of said control gap, means for repeatedly quenching the discharge across said anode gap, and means for causing a recharging current to flow in said discharge circuit for charging said condenser by an amount which is sufficient when added to the charge derived by the condenser from said charging source to prevent the charge on said condenser from falling below said predetermined value.

8. The combination in a timing mechanism of a condenser, a source of charging current for charging said condenser to a predetermined value in a desired interval of time, a gas-filled tube having a control gap and an anode gap, a discharge circuit including said condenser and said control gap for ionizing said control gap when the charge on said condenser reaches the predetermined value and for maintaining the control gap ionized as long as the charge does not fall below said value, an anode circuit including the anode gap of said tube, means for causing a current discharge to occur across the anode gap in response to ionization of said control gap, a source of alternating potential in said anode circuit for quenching the discharge of said anode gap at each alternate oscillation, and inductive means effective during each cycle of said alternating potential for causing current to flow in said discharge circuit to recharge said condenser.

9. The combination in a timing system of a condenser, a charging circuit for said condenser, means for opening and closing said circuit, a source of current for charging said condenser while said circuit is closed, a resistance in said charging circuit for determining a measured interval of time required to charge the condenser to a predetermined value, a gas-filled tube having a control gap and an anode gap, a discharge circuit including the condenser and said control gap for maintaining the control gap ionized as long as the charge on said condenser is not less than said predetermined value, a resistance element in said discharge circuit for limiting the value of discharge current flowing from said condenser, an anode circuit and a source of direct potential therein for causing a discharge across the anode gap in response to ionization of the control gap, said direct potential source being sufficient to maintain current flowing in said anode circuit independent of the control gap, a source of alternating potential in said anode circuit opposing at each half-cycle thereof the direct potential source to quench the discharge of said anode gap, and an impedance element in the anode circuit effective during each cycle of said alternating potential to cause a recharging current to flow in said discharge circuit to recharge said condenser by an amount which is less than the discharge current taken from said condenser.

10. The combination in a timing mechanism of a condenser, a charging circuit therefor, a resistance in said circuit, a source of charging current for charging said condenser through said resistance to a predetermined value to measure a desired interval of time, a gas-filled tube having a control gap and an anode gap, an anode circuit for the tube including said anode gap, a discharge circuit for said condenser for ionizing said control gap when the charge thereon reaches said predetermined value, a source for causing the flow of direct current in the anode circuit and across the anode gap in response to ionization of the control gap, a source of alternating voltage effective on each cycle to oppose said direct current source and quench the anode gap discharge, and means operative in response to the flow of current in the anode circuit and effective to produce a voltage across the control gap causing a current to flow in the discharge circuit to recharge said condenser.

11. The combination in a timing mechanism of a condenser, a source of charging current for charging said condenser to a predetermined value in a desired interval of time, a gas-filled tube having a control gap and an anode gap, a discharge circuit including said condenser and said control gap for maintaining said control gap ionized as long as said condenser remains charged to said predetermined value, an anode circuit including the anode gap of said tube, means for causing a current discharge to occur across the anode gap in response to ionization of said control gap, means for repeatedly quenching the discharge across said anode gap, means in the anode circuit for causing a recharging current to flow in said discharge circuit to recharge said condenser, and means connected to the anode circuit for limiting the recharging of said condenser to an amount which is less than the discharge taken from said condenser to maintain the ionization of said control gap.

12. The combination in a timing mechanism of a condenser, a source of charging current for charging said condenser to a predetermined value in a desired interval of time, a gas-filled tube having a control gap and an anode gap, a discharge circuit including said condenser and said control gap for maintaining said control gap ionized as long as said condenser remains charged to said predetermined value, an anode circuit including the anode gap of said tube, means for causing a current discharge to occur across the anode gap in response to ionization of said control gap, means for repeatedly quenching the discharge across said anode gap, a work relay in said anode circuit responsive to the flow of current therein to mark the termination of the desired period of time, the impedance of said relay serving to produce a voltage across said control gap which causes a recharging current to flow in said discharge circuit to recharge said condenser, and a second condenser for controlling said voltage to limit the value of the recharging current and serving to maintain said relay operated during the intervals in which no current is flowing into the anode circuit.

13. The combination in a timing mechanism of a condenser, a charging circuit having a resistance element therein, a source of charging current for charging said condenser through said resistance element to a predetermined value in a desired interval of time, a gas-filled tube having a control gap and an anode gap, a discharge circuit including said condenser and said control gap for ionizing said control gap when the charge on said condenser is at said predetermined value, an anode circuit including the anode gap of said tube, means for causing a current discharge to occur across the anode gap in response to ionization of said control gap, a source of alternating potential for repeatedly quenching the discharge in said anode gap, and a second resistance element in the discharge circuit having a value relative to the value of said first resistance element which limits the amount of discharge taken from said condenser sufficiently to prevent the current flowing in said anode circuit from oscillating at a frequency lower than that of said alternating potential source.

14. The combination in a timing mechanism for measuring a predetermined interval of time of a condenser, a charging circuit having a resistance element therein, means for closing said circuit for a period of time which exceeds the predetermined interval to be measured, a source of charging current effective when said circuit is closed for charging said condenser through said resistance element to a given value in said predetermined interval of time, a discharge tube having a control gap and an anode gap, a discharge circuit including said condenser and said control gap, said condenser serving to ionize the control gap at the end of said predetermined interval and to maintain it ionized following the opening of said charging circuit until the ionizing current flowing across said control gap dissipates the charge on said condenser below said given value, means for causing a current discharge to occur across the anode gap in response to ionization of said control gap, a resistance in the discharge circuit for limiting the amount of charge taken from said condenser, and a source of alternating potential in the anode circuit for quenching said anode gap at each cycle of said potential source.

WILLIAM H. T. HOLDEN.